(12) United States Patent
Chang

(10) Patent No.: US 7,417,812 B2
(45) Date of Patent: Aug. 26, 2008

(54) MICROMINIATURE LENS MODULE AND LENS DEVICE HAVING THE SAME

(75) Inventor: Ching Sheng Chang, Taichung (TW)

(73) Assignee: PowerGate Optical Inc., Hsinchu County (TW)

( * ) Notice: Subject to any disclaimer, the term of this patent is extended or adjusted under 35 U.S.C. 154(b) by 109 days.

(21) Appl. No.: 11/494,536

(22) Filed: Jul. 28, 2006

(65) Prior Publication Data

US 2007/0217039 A1  Sep. 20, 2007

(30) Foreign Application Priority Data

Mar. 14, 2006 (TW) .............................. 95108507 A

(51) Int. Cl.
*G02B 7/02* (2006.01)

(52) U.S. Cl. ...................................... 359/829; 359/819

(58) Field of Classification Search ......... 359/819–824, 359/829
See application file for complete search history.

(56) References Cited

U.S. PATENT DOCUMENTS 5,961,849 A * 10/1999 Bostock et al. ............... 216/24

* cited by examiner

*Primary Examiner*—Mohammed Hasan
(74) *Attorney, Agent, or Firm*—Troxell Law Office, PLLC

(57) ABSTRACT

The present invention is related to a microminiature lens module and a lens device with the microminiature lens module. The microminiature lens module is applied in the lens device in order to decrease the entire outer diameter of the lens device. The microminiature lens module comprises a containing base and a lens set, wherein the containing base has a through hole, and an inner thread is located on a partial inner wall of the through hole. A radius with the inner thread of the through hole is smaller than a radius without the inner thread of the through hole. The lens set is female-connected to the through hole. An outer thread is on an outer rim of the lens set where relative to the inner thread, and the outer thread collocates the inner thread. A radius with the outer thread of the lens set is smaller than a radius without the outer thread of the lens set. As a result of the containing base collocating the lens set, the entire outer diameter of the lens module can be effectively reduced so as to microminiaturize, simplify, and easily assemble the lens module.

8 Claims, 6 Drawing Sheets

MICROMINIATURE LENS MODULE AND LENS DEVICE HAVING THE SAME

BACKGROUND OF INVENTION

1. Field of the Invention

The present invention is related to a microminiature lens module and a lens device with the microminiature lens module, more particularly, to a microminiature lens module, in which overall dimensions of the lens module are capable of being effectively microminiaturized by way of a thread located on a front end of a lens set collocating a thread located on a front end of a containing base.

2. Description of the Prior Art

Referring to FIG. 1A and FIG. 1B, which are an exploded longitudinal schematic view and an assembled longitudinal schematic view of a conventional lens module. The conventional lens module 1 comprises a containing base 10 and a lens set 11, wherein an inner rim of the containing base 10 has an inner thread 101, an outer rim of the lens set 11 has an outer thread 111, the lens set 11 is screwed into the containing base 10 through a front end of the containing base 10, and the inner thread 101 of the containing base 10 collocates the outer thread 111 of the lens set 11 to fasten the prior lens module 1.

By defining a radius of the lens set 11 as $\Phi$, thicknesses of the inner threads 101 and the outer threads 111 as S, and a wall thickness of the containing base 10 as D, the total thickness of the prior lens module 1 is $2\times(\Phi+S+D)$. However, such an assembly for the lens set 11 installed in the containing base 10 may be too complicated and, as a result, costly. As an example, the total thickness of the lens module 1 results in an overall larger volume and a heavier weight of the product to which the lens module 1 is applied. Additionally, difficulties are encountered with respect to the processes for installing the lens set 11 in the containing base 10. This runs counter to current trends of increasing the effective number of pixels and reducing weight. On the other hand, two or more devices may be integrated as a single device so as to obtain more functions. Examples of such integration include combining a camera and a mobile phone, assembling a camera and a PDA, and merging a camera and a laptop. Therefore, important issues addressed by those skilled in the art relate to how to achieve reduced volume, lower cost, and save energy by using the same power source so as to increase the life time of the power source.

These are important issues that require continued development, and are addressed by the present invention discussed in the following.

SUMMARY OF INVENTION

The first objective of the present invention is to provide a microminiature lens module and a lens device with the microminiature lens module. Compared with the prior art, the microminiature lens module and the lens device with the microminiature lens module have a smaller volume and a simpler structure, are easier to assemble, and save more energy.

The second objective of the present invention is to provide a microminiature lens module that comprises a containing base and a lens set. An inner thread is formed on an inner wall of a through hole of the containing base. A radius with the inner thread of the through hole is smaller than another radius without the inner thread of the through hole. An outer rim of the lens set that is female-connected to the through hole has an outer thread relative to the inner thread, a radius with the outer thread of the lens set being smaller than another radius without the outer thread of the lens set. Hence, the total outer diameter of the lens module is significantly decreased to achieve the smaller volume mentioned above.

The third objective of the present invention is to provide a microminiature lens module, in which the lens module has a partial thread and is a simpler mechanism to allow for easy assembly, thereby achieving the simpler structure and easier assembly mentioned above.

The fourth objective of the present invention is to provide a microminiature lens module that reduces the overall volume of the lens module, as well as its weight. Due to the reduction of the overall weight of the lens module, the power required to drive the lens module is reduced, thereby saving energy as discussed above.

To achieve the objectives aforementioned, a preferred embodiment of the microminiature lens module of the present invention is available to other related means for forming a lens device. The lens device comprises a lens module, a magnetic base, and a transparent anti-dust cover. The lens module has a containing base and a lens set. The containing base has a through hole. The lens set is female-connected to the containing base and fastened by means of the outer thread on the partial portion of the outer rim and the inner thread of the inner wall of the through hole. The radius with the outer thread of the lens set is smaller than the radius without the outer thread of the lens set. The lens module is female-connected to the magnetic base, and a position of the lens module can be adjusted by way of a magnetic force supplied by the magnetic base in order to regulate focal length. The transparent anti-dust cover is mounted on a front end of the magnetic base. The transparent anti-dust cover has a coated film for anti-reflection, filtering, etc.

In the preferred embodiment, the lens set has at least a first lens and a second lens. The first lens is installed to a location relative to the outer thread, and the second lens is installed to a location without the outer thread, wherein the first lens is a smaller lens and the second lens is a larger lens.

BRIEF DESCRIPTION OF THE DRAWINGS

The details of the present invention will be more readily understood from a detailed description of the preferred embodiments taken in conjunction with the following figures.

DETAILED DESCRIPTION

The primary concept behind a microminiature lens module of the present invention is that of utilizing a smaller lens in which a thread of a lens set is embedded in a largest outer diameter of the lens set. Therefore, the total outer diameter of the lens module is reduced since the thread of the lens set is embedded in the largest outer diameter of the lens set. In addition, the volume of the lens module is also reduced, such that the microminiature lens module is broadly applied. It follows, therefore, that the weight of the lens module is decreased, as is the power per unit time required to drive the lens module to thereby lengthen its operational time.

Figure 1A:
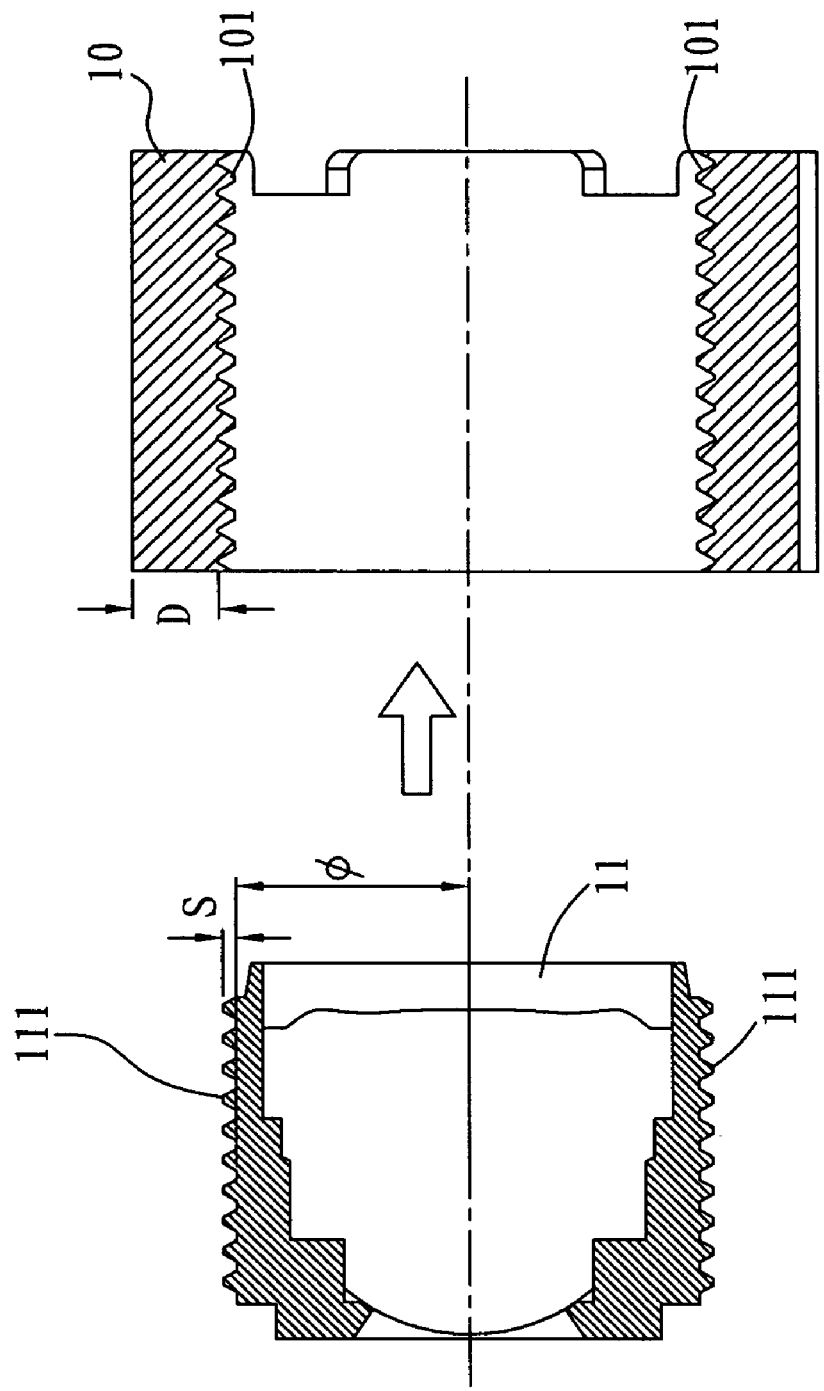
FIG. 1A is an exploded longitudinal schematic view of a prior art lens module.
Figure 1B:
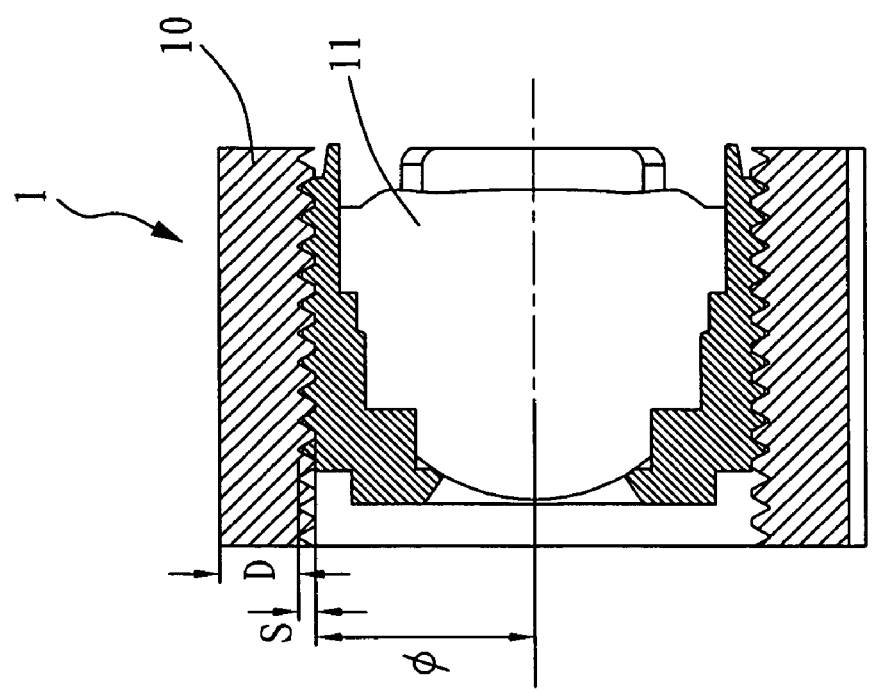
FIG. 1B is an assembled longitudinal schematic view of the prior art lens module.
Figure 2A:
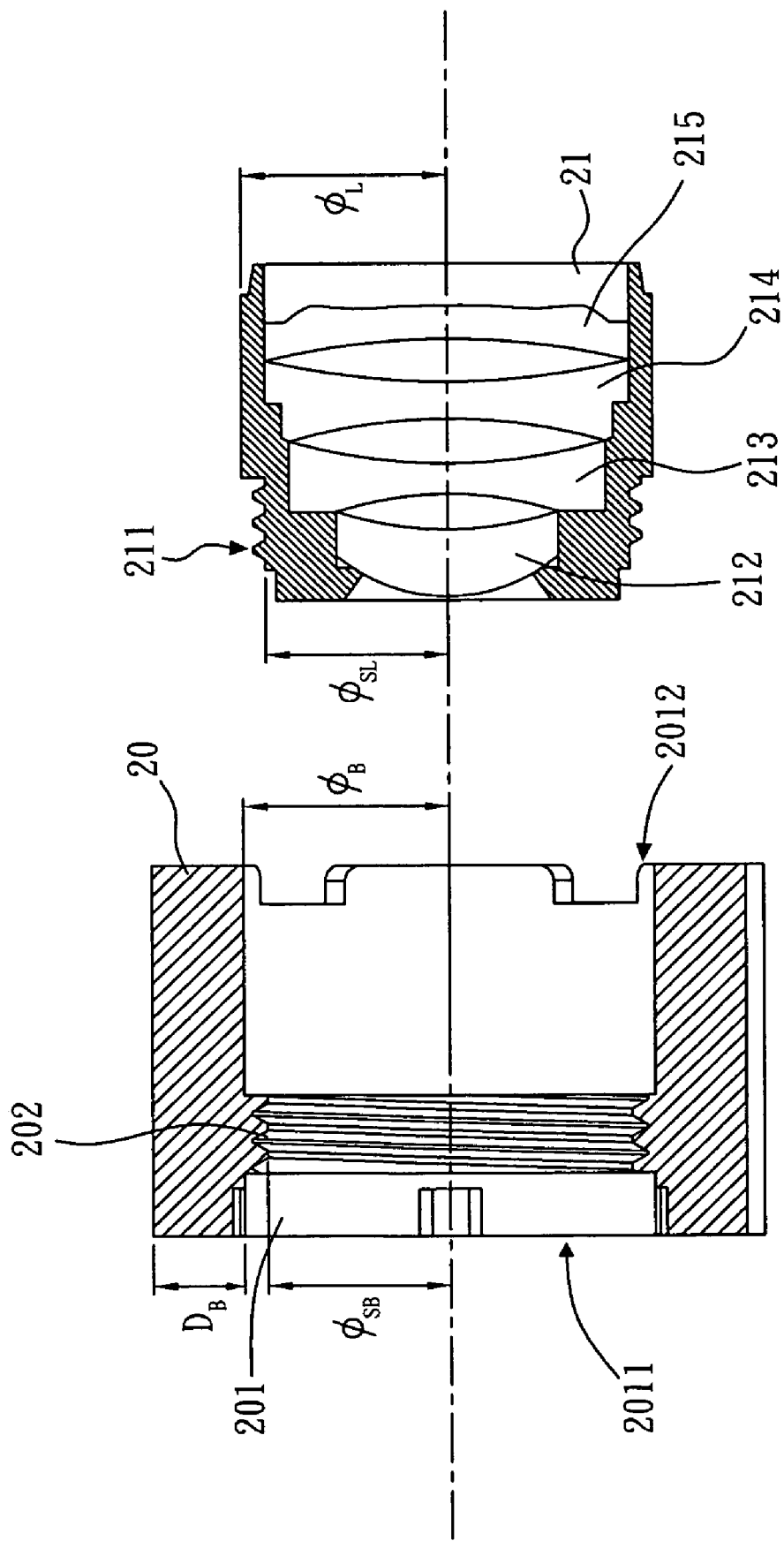
FIG. 2A is an exploded longitudinal schematic view of a preferred embodiment of a lens module of the present invention.
Figure 2B:
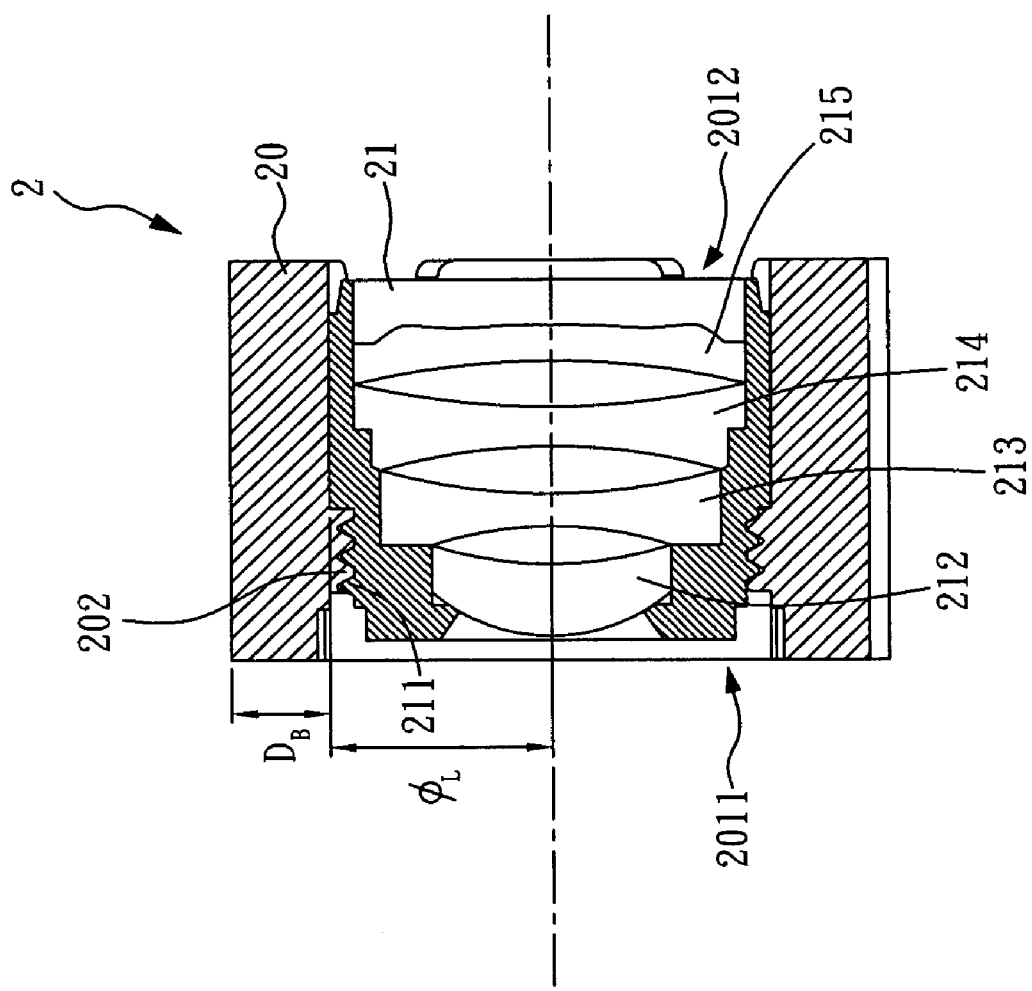
FIG. 2B is an assembled longitudinal schematic view of the preferred embodiment of the lens module of the present invention.

Referring to FIG. 2A and FIG. 2B, which are an exploded longitudinal schematic view and an assembled longitudinal schematic view of a preferred embodiment of the lens module of the present invention, the microminiature lens module 2 comprises a containing base 20 and a lens set 21, wherein the lens set 21 is female-connected to a through hole 201 centrally located in the containing base 20. Hence, the lens module 2 is assembled by the collocation of an outer thread 211 of the lens set 21 and an inner thread 202 of the containing base 20.

Referring to FIG. 2A, a wall thickness of the containing base 20 is defined as $D_B$. The inner thread 202 is on a partial inner wall of the through hole 201 of the containing base 20, and a radius $\Phi_{SB}$ with the inner thread 202 of the through hole 201 is smaller than a radius $\Phi_B$ without the inner thread 202 of the through hole 201 ($\Phi_{SB} < \Phi_B$). A structure with a cylindrical stairway shape is formed in the through hole 201 since the inner thread 202 is embedded in the through hole 201. The structure is reduced in size gradually. The through hole 201 has a first open 2011 and a second open 2012 respectively located at a front end and a rear end of the containing base 20. The first open 2011 is closer to the inner thread 202 than the second open 2012.

Referring again to FIG. 2A, an outer rim of the lens set 21 has an outer thread 211 relatively located to the inner thread 202 of the containing base 20, and the two threads collocate each other. The lens set 21 comprises at least a first lens 212 and a second lens 213, wherein the first lens 212 is smaller and installed relatively to the outer thread 211. The second lens 213 is larger and installed relatively to a location without the outer thread 211 of the lens set 21. As a result of a dimensional difference between the first lens 212 and the second lens 213, a radius $\Phi_{SL}$ with the outer thread 211 of the lens set 21 is smaller than a radius $\Phi_L$ without the outer thread 211 of the lens set 21 ($\Phi_{SL} < \Phi_L$) so as to embed the outer thread 211 into the outer rim of the lens set 21. In the preferred embodiment, the lens set 21 further comprises a third lens 214 and a fourth lens 215, both of which are on a right side of the second lens 213. In other words, the third lens 214 and the fourth lens 215 are on a tail end of the lens set 21 in order to achieve a better focusing operation.

Referring to FIG. 2A and FIG. 2B, the lens set 21 is fastened in the containing base 20 by first inserting a front end with the outer thread 211 of the lens set 21 into the through hole 201 via the second open 2012, and continuously to the inner thread 202 of the through hole 201. Subsequently, the lens set 21 is screwed into the containing base 20 to be fastened thereto by means of cooperation between the inner thread 202 and the outer thread 211. In the preferred embodiment, the two threads (the inner thread 202 and the outer thread 211) are partially located on the containing base 20 and the lens set 21. Hence, the arrangement is different from that of the prior art arrangements. That is, the mechanism of the lens module 2 is simpler. Secondly, the number of screw turns of the lens set 21 into the containing base 20 is significantly less than in the prior art. Finally, manufacturing costs are considerably reduced.

Referring to FIG. 2B, the total outer diameter of the assembled lens module 2 after the inner thread 202 is fitted to the outer thread 211 is $2 \times (D_B + \Phi_L)$. Compared to the total thickness for the prior lens module 1 of $2 \times (\Phi + S + D)$, a reduction in the thread thickness of 2S is achieved. Therefore, the purpose of microminiaturization is fully achieved to thereby save material costs, and ultimately, reduce the overall cost of the lens device.

Figure 3A:
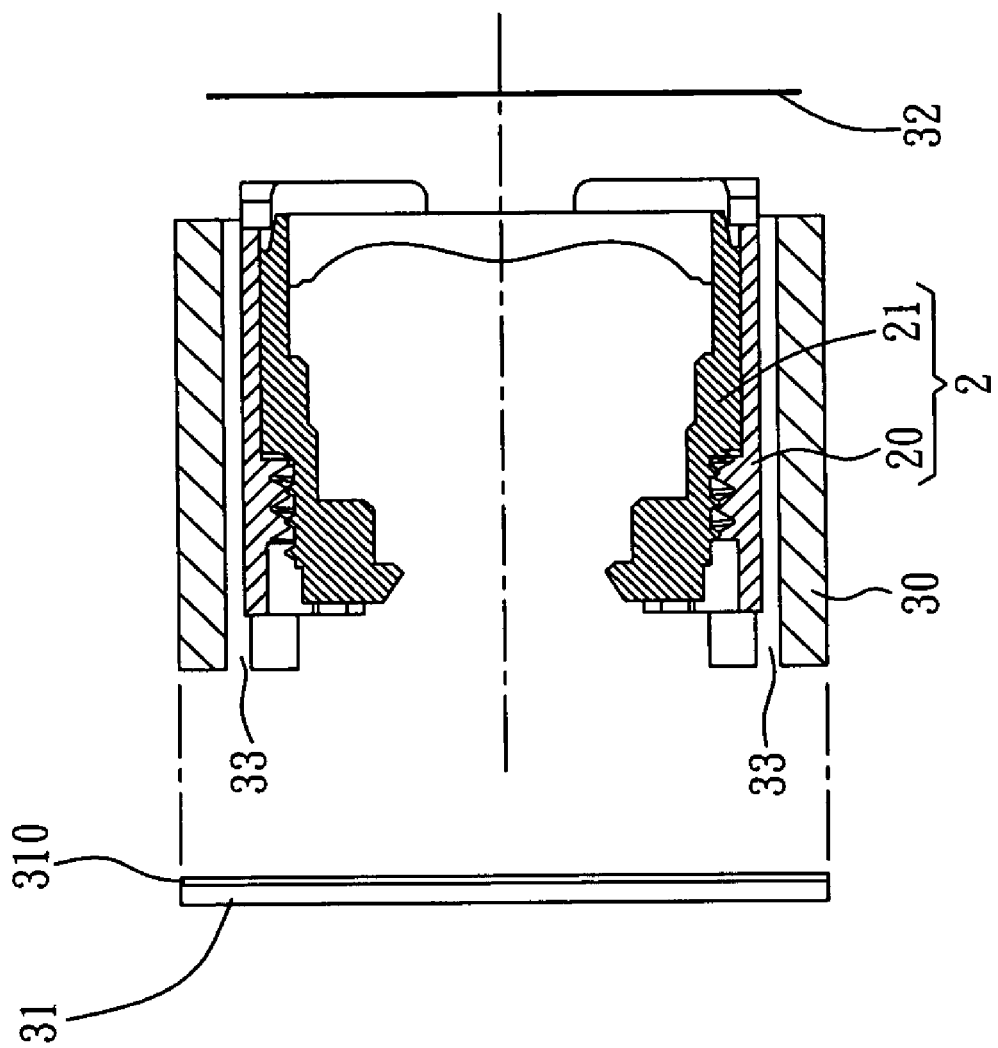
FIG. 3A is an exploded longitudinal schematic view of a preferred embodiment of a lens device with the microminiature lens module of the present invention.
Figure 3B:
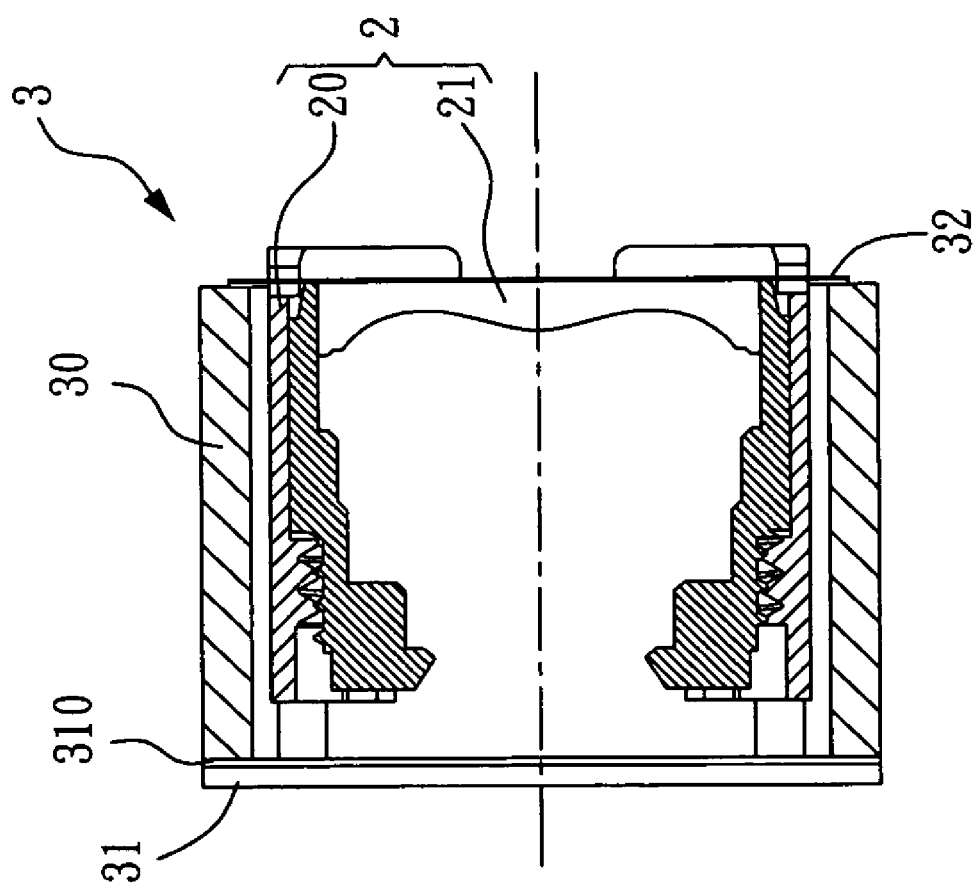
FIG. 3B is an assembled longitudinal schematic view of the preferred embodiment of the lens device with the microminiature lens module of the present invention.

Referring to FIG. 3A and FIG. 3B, which are an exploded longitudinal schematic view and an assembled longitudinal schematic view of a preferred embodiment of a lens device with the microminiature lens module of the present invention, the lens device 3 comprises the lens module 2 (as shown in FIG. 2A and FIG. 2B), a magnetic base 30, a transparent anti-dust cover 31, and a sensor 32. The lens module 2 comprises the containing base 20 and the lens set 21. The containing base 20 has a through hole 201, and the lens module 2 is female-connected to the through hole 201. The lens module 2 is fastened for assembling by means of the outer thread 211 on the partial outer rim and the inner thread 202 on the inner wall of the through hole 201, and the radius with the outer thread 211 of the lens set 21 is smaller than the radius without the outer thread 211 of the lens set 21. Other aspects of the structure have been described above with reference to FIGS. 2A and 2B, and will, therefore, not be discussed again hereinafter. The lens module 2 is female-connected to the magnetic base 30, and the lens module 2 is movable by the magnetic force of the magnetic base 30 so as to regulate the focal lengths. Due to a gap 33 between the magnetic base 30 and the lens module 2, the transparent anti-dust cover 31 is added on a front end of the magnetic base 30 in order to prevent contamination of the sensor 32 by particles entering through the gap 33. In addition, a coated optical film 310 is added on the transparent anti-dust cover 31 for protection and providing more functions to the lens device, such as antireflection, filtering, etc.

Because the overall diameter of the lens module 2 is reduced by the amount of 2S of the thread thickness as discussed above, the amount of material required for manufacture of the lens module 2 is reduced so as to minimize the weight of the lens module 2. This also functions to reduce the power required for the magnetic base 30 to drive the lens module. The magnetic base 30 may optionally be a magnetic base in the present market to collocate the lens module 2. The technology of the magnetic base 30 does not fall within the technical scope of the present invention, and so an explanation thereof will not be provided herein.

While the invention has been described by way of examples and in terms of the preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens device with a microminiature lens module, comprising:

a lens module having a containing base and a lens set, the containing base having a through hole, the lens set being female-connected the containing base and fastened by means of an outer thread on a partial portion of an outer rim of the lens set collocating an inner thread of an inner wall of the through hole, a radius with the outer thread of the lens set being smaller than another radius without the outer thread of the through hole;

a magnetic base magnetically driving the lens module, the lens module being female-connected the magnetic base; and a transparent anti-dust cover being mounted on a front end of the magnetic base.

2. The lens device with a microminiature lens module according to claim 1, wherein a gap is formed between the magnetic base and the lens module.

3. The lens device with a microminiature lens module according to claim 1, wherein the transparent anti-dust cover has a coated film.

4. The lens device according to claim 1, wherein the through hole has a first open and a second open, which are on two ends of the containing base respectively, the first open being closer to the inner thread than the second open.

5. The lens device according to claim 4, wherein the lens set has an outer thread end, the outer thread end entering the through hole by means of the second open, and the inner thread collocating the outer thread so as to let the lens set be screwed into the containing base.

6. The lens device according to claim 1, wherein the through hole is a structure with a cylindrical stairway shape.

7. The lens device according to claim 1, wherein the lens set has at least a first lens and a second lens, the first lens being installed to a location relative to the outer thread, the second lens being installed to a location without the outer thread.

8. The lens device according to claim 7, wherein the first lens is a smaller lens and the second lens is a larger lens.

* * * * *